March 28, 1939.  H. S. JANDUS ET AL  2,151,920
TRAILER HITCHING
Filed June 5, 1937
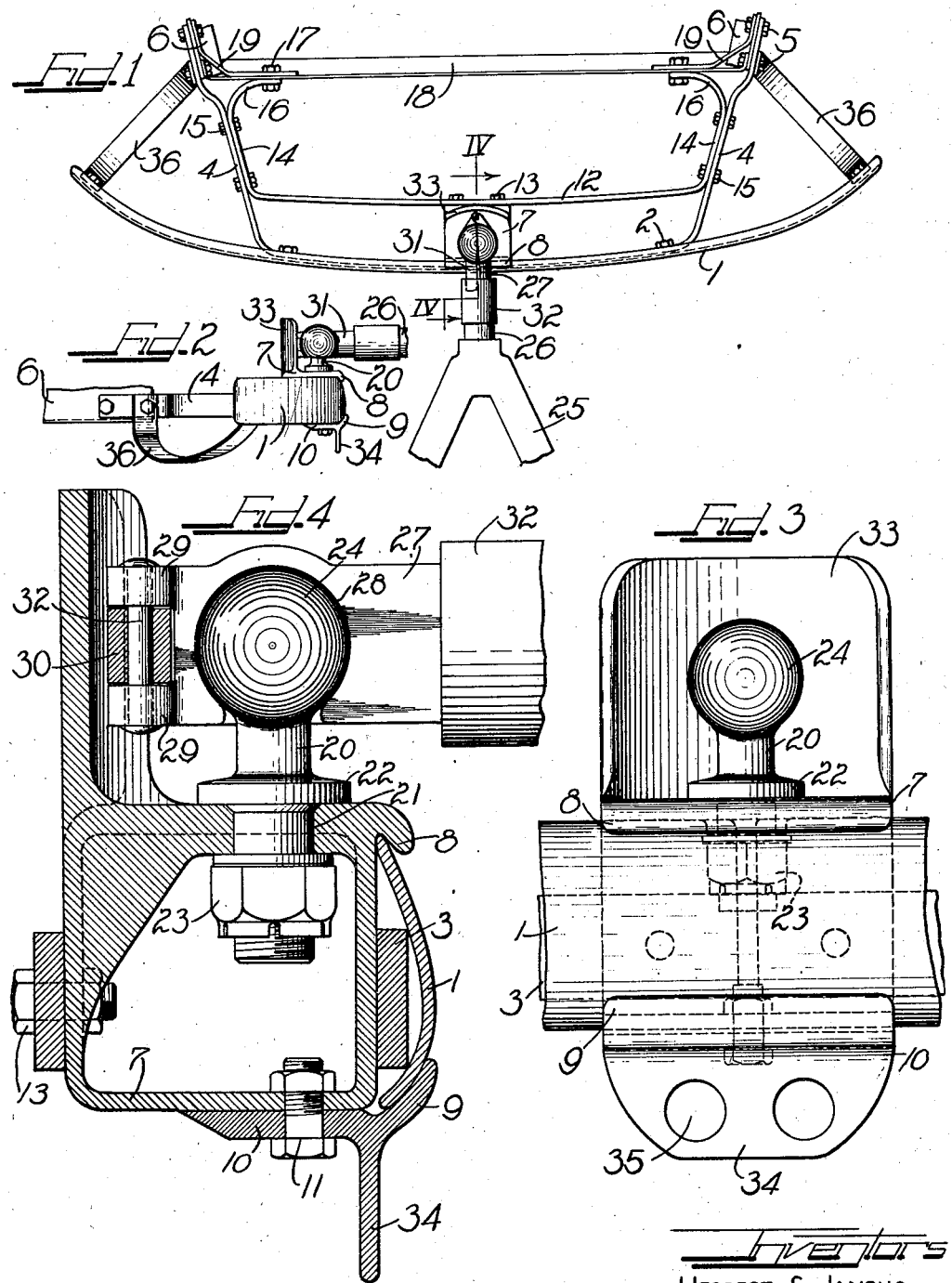
Inventors
HERBERT S. JANDUS
HAROLD LEE BROOKE Patented Mar. 28, 1939

2,151,920

UNITED STATES PATENT OFFICE 2,151,920

TRAILER HITCHING

Herbert S. Jandus and Harold Lee Brooke, Detroit, Mich., assignors, by mesne assignments, to Houdaille-Hershey Corporation, Detroit, Mich., a corporation of Michigan Application June 5, 1937, Serial No. 146,532

1 Claim. (Cl. 280—33.44)

This invention relates to the hitching of trailers to automobiles or motor cars, the general object being to provide for convenient and more practical hitching connection and arrangement.

Heretofore, the general arrangement for hitching a trailer to an automobile has been to connect the end of the trailer tongue by a suitable hitch connection or coupling with the end of a draw bar structure secured to and extending rearwardly from the automobile chassis or axle structure. Many of these prior hitching arrangements required the securing of cumbersome structures to the automobile body to serve as a draw bar and to support a hitch member, usually a ball for receiving companion hitch structure on the trailer tongue, and in many cases hitching and unhitching can be accomplished only with difficulty and inconvenience.

As all automobiles and motor cars are provided with rear bumper structures, our invention proposes to utilize rear bumper structures as draw bar structures to which the trailers may be hitched. In accordance with our invention, rear bumper structures may retain their general design and enough resiliency so that they may properly function as bumpers when there is no trailer hitched thereto, but the bumper structures are sufficiently strengthened to act as draw bar structures to which a trailer may be conveniently hitched and which structures may afford a more or less resilient connection between a trailer and an automobile body.

The various features of our invention are incorporated in the structure shown on the drawing, in which drawing:

Figure 1 is a plan view of a rear bumper secured to the ends of a vehicle chassis and showing the end of a trailer tongue hitched thereto;

Figure 2 is an end view of the structure shown in Figure 1;

Figure 3 is an enlarged front view of the hitch member elements supported on the bumper structure; and Figure 4 is an enlarged section on plane IV—IV of Figure 1.

Referring to Figure 1, the bumper structure shown comprises the horizontally extending front bumper or impact bar 1 secured along its middle portion, as by bolts 2, to the yoke portion of a U-shape supporting bar structure 3 whose legs 4 extend diagonally rearwardly to be secured, as by bolts 5, to the webs of the vehicle chassis side beams 6.

The hitch connection with the bumper structure comprises a box-like hollow frame 7, having a lip 8 depending from its upper front corner for overhanging the top edge of the impact bar 1, the lower edge portion of the impact bar being received by a lip 9 extending upwardly from a bracket 10 secured against the underside of the frame 7 as by means of bolt 11. The impact bar shown is of forwardly convex transverse curvature, the yoke portion of the supporting bar structure 3 engaging in the rear concave side of the impact bar so that when the frame 7 is applied and the bracket 10 secured thereto, the impact bar and the supporting bar 3 will be clamped by the lips 8 and 9 against the front side of the frame 7 and the frame securely held in place at a point midway between the ends of the bumper structure.

In order to further secure and to stabilize the hitch frame 7, a U-shape cross bar structure 12 may be provided as shown on the bumper structure with its yoke portion secured to the rear wall of the frame 7 as by bolts 13, and the legs 14 of the bar structure 12 may be secured, as by bolts 15, to the legs 4 of the main supporting bar structure 3. Further strength of the bumper structure may be obtained by deflecting the end portions 16 of the legs of the bar 12 laterally inwardly for securing, as by bolts 17, with an angle brace 18 extending between and secured to the webs of the chassis beam 6, and braces 19 may be secured to and extend between the ends of the angle bar 18 and the chassis beams.

A stud 20 extends through an opening 21 in the top wall of the frame 7, the stud having a seating flange 22 engaging the top of the frame and the lower end of the stud being threaded for reception of a nut 23 for clamping the stud in place, the stud at its upper end terminating in a ball 24.

As shown, the tongue 25 of a trailer (not shown) has a cylindrical shank 26 extending therefrom which has the semi-cylindrical extension 27 in which is formed the semi-spherical socket 28 to receive the ball 24. At its outer end the socket member 27 has hinge ears 29 for receiving between them a hinge lug 30 on the companion socket member 31, a hinge pin 32 extending through the ears and lugs. The socket member 31 has a semi-spherical socket, and when this member is swung away from the socket member 27, this socket member 27 may be applied to receive the ball 24 and the socket member 31 is then swung to closed position so that the ball will be received in the opposed semi-spherical sockets. To secure the socket members together in ball clamping position, a sleeve 32 is provided on the shank 26, which sleeve is slid outwardly to receive the end of the socket member 31 after application thereof to the ball, and when it is desired to unhitch, the sleeve is shifted inwardly to release the socket member 31. The arrangement may be substantially like that shown for example in Patent No. 1,977,065, dated October 16, 1934, but any other suitable coupling structure may be used for receiving the hitch ball 24.

The hitch ball 24 is a sufficient distance above the frame 7 so that there will be no danger of the trailer tongue 25 striking the bumper structure impact bar when the coupled vehicles turn corners or travel over irregular roadways. A guard wall 33 is also preferably provided on the frame 7 behind the hitch connection. The wall 33, or the front face thereof, may be transversely arcuate with the center of curvature in the axis of the stud 20, the wall thus facilitating proper alignment for hitch connection, when the vehicles are moved together for hitching of the trailer to the automobile.

The bracket 10 may be provided with a depending flange 34 having holes 35 therethrough which may be utilized for supporting electric conductors extending from the automobile to the trailer, or which might be utilized for supporting structure or mechanism for controlling the braking of the trailer.

On the bumper structure shown, spring bars 36 of suitable shape extend from the outer ends of the bumper impact bar 1 to the chassis structure to resiliently resist flexure of the impact bar ends and to protect the fenders of the automobile against impact by the trailer when the automobile makes very sharp turns.

We thus provide improved and more practical hitching arrangement in which the rear bumper structure of an automobile may efficiently serve the purpose of a draw bar structure ad support a hitch member for convenient hitch connection with a trailer, and, with the bumper bar structure's flexibility, may afford a yieldable and shock absorbing connection between the vehicle and the trailer. Rear bumper bar structures on automobiles may retain their individuality of design but can readily have their structure and their connection with the vehicle chassis modified to provide the strength necessary for functioning thereof as a resilient drawbar structure for trailer propulsion service. Types of hitch connection between a trailer and the bumper structure, other than that shown, may be used. We do not therefore desire to be limited to the exact construction, arrangement, and operation shown and described, as the main feature of our invention is the utilization of a bumper structure as a draw bar structure for connection of trailer vehicles to automobile vehicles.

We claim as follows:

A trailer hitching attachment for a bumper structure having a front horizontally extending impact bar and a rear horizontally extending reinforcing bar spaced away therefrom, said attachment comprising a hollow rectangular block for fitting between said bars and adapted to have its rear wall secured to the reinforcing bar, a depending lip along the front upper edge of said block for receiving the upper edge of the impact bumper bar, a detachable bracket engaging the lower wall of said block and having an upwardly extending lip for receiving the lower edge of the impact bumper bar whereby said impact bumper bar may be clamped between said lips, and an upwardly extending stud secured to the top wall of said block and terminating in a ball for receiving hitching socket structure on trailers.

HERBERT S. JANDUS.
HAROLD LEE BROOKE.